US011119556B2

(12) United States Patent
Patel

(10) Patent No.: US 11,119,556 B2
(45) Date of Patent: *Sep. 14, 2021

(54) APPARATUSES AND METHODS FOR INDICATING AN OPERATION TYPE ASSOCIATED WITH A POWER MANAGEMENT EVENT

(71) Applicant: Micron Technology, Inc., Boise, ID (US)

(72) Inventor: Vipul Patel, Santa Clara, CA (US)

(73) Assignee: Micron Technology, Inc., Boise, ID (US)

( * ) Notice: Subject to any disclaimer, the term of this patent is extended or adjusted under 35 U.S.C. 154(b) by 168 days.

This patent is subject to a terminal disclaimer.

(21) Appl. No.: 16/550,379

(22) Filed: Aug. 26, 2019

(65) Prior Publication Data
US 2019/0377396 A1 Dec. 12, 2019

Related U.S. Application Data

(63) Continuation of application No. 15/838,048, filed on Dec. 11, 2017, now Pat. No. 10,528,111.

(51) Int. Cl.
*G06F 1/28* (2006.01)
*G06F 1/3296* (2019.01)
(Continued)

(52) U.S. Cl.
CPC .............. *G06F 1/28* (2013.01); *G06F 1/3206* (2013.01); *G06F 1/3275* (2013.01);
(Continued)

(58) Field of Classification Search
CPC ........ G06F 1/3202; G06F 1/3231; G06F 1/26; G06F 1/206; G06F 1/3228; G06F 1/08;
(Continued)

(56) References Cited

U.S. PATENT DOCUMENTS 6,385,021 B1 5/2002 Takeda et al.
6,724,603 B2 4/2004 Miller et al.
(Continued)

FOREIGN PATENT DOCUMENTS

CN 103460296 A 12/2013
CN 105718390 A 6/2016

OTHER PUBLICATIONS

Office Action from related Chinese patent application No. 201811495976.5, dated Feb. 25, 2020, 8 pages.

*Primary Examiner* — Zahid Choudhury
(74) *Attorney, Agent, or Firm* — Brooks, Cameron & Huebsch, PLLC

(57) ABSTRACT

The present disclosure includes apparatuses and methods for providing indications associated with power management events. An example apparatus may include a plurality of memory units coupled to a shared power management signal. In this example apparatus, each of the plurality of memory units may be configured to provide to the other of the plurality of memory units, via the shared power management signal, an indication of whether the one of the plurality of memory units is entering a power management event. Further, each of the plurality of memory units may be configured to, if the one of the plurality of memory units is entering the power management event, an indication of a particular operation type associated with the power management event.

19 Claims, 5 Drawing Sheets

(51) Int. Cl.
*G06F 3/06* (2006.01)
*G06F 1/3206* (2019.01)
*G06F 1/3234* (2019.01)

(52) U.S. Cl.
CPC .......... *G06F 1/3296* (2013.01); *G06F 3/0625* (2013.01); *G06F 3/0653* (2013.01); *G06F 3/0683* (2013.01)

(58) Field of Classification Search
CPC ....... G06F 1/3289; G06F 1/266; H04L 12/12; H04L 12/10
See application file for complete search history.

(56) References Cited

U.S. PATENT DOCUMENTS

| | | |
|---|---|---|
| 9,779,806 B2 | 10/2017 | Johnson |
| 9,921,768 B2 | 3/2018 | Jen et al. |
| 2009/0132844 A1 | 5/2009 | Allarey |
| 2015/0009773 A1 | 1/2015 | Grunzke |
| 2015/0371719 A1 | 12/2015 | Nguyen |
| 2016/0055900 A1 | 2/2016 | Bahramshahry et al. |
| 2016/0065218 A1* | 3/2016 | Oda .................. H03K 19/1733 326/38 |

\* cited by examiner

| SYSTEM | CURRENT LIMIT | CONFIGURATIONS | |
|---|---|---|---|
| MEMORY DEVICE 410-1 | 200 mA | CONFIGURATION | 434-1 |
| | | CONFIGURATION | 434-3 |
| MEMORY DEVICE 410-2 | 300 mA | CONFIGURATION | 434-1 |
| | | CONFIGURATION | 434-2 |
| | | CONFIGURATION | 434-5 |

*Fig. 4D*

| SYSTEM | CURRENT LIMIT | CONFIGURATIONS | |
|---|---|---|---|
| MEMORY DEVICE 410-1 | 200 mA | CONFIGURATION | 434-3 |
| MEMORY DEVICE 410-2 | 300 mA | CONFIGURATION | 434-3 |
| | | CONFIGURATION | 434-4 |

*Fig. 4E*

APPARATUSES AND METHODS FOR INDICATING AN OPERATION TYPE ASSOCIATED WITH A POWER MANAGEMENT EVENT

PRIORITY INFORMATION

This application is a Continuation of U.S. application Ser. No. 15/838,048, filed Dec. 11, 2017, the contents of which are included herein by reference.

TECHNICAL FIELD

The present disclosure relates generally to semiconductor memory and methods, and more particularly, to power management.

BACKGROUND

Memory devices are typically provided as internal, semiconductor, integrated circuits in computers or other electronic devices. There are many different types of memory including volatile and non-volatile memory. Volatile memory can require power to maintain its data and can include random-access memory (RAM), dynamic random access memory (DRAM), and synchronous dynamic random access memory (SDRAM), among others. Non-volatile memory can provide persistent data by retaining stored data when not powered and can include NAND flash memory, NOR flash memory, read only memory (ROM), and resistance variable memory such as phase change random access memory (PCRAM), resistive random access memory (RRAM), and magnetic random access memory (MRAM), among others.

Memory devices can be utilized as volatile and non-volatile memory for a wide range of electronic applications in need of high memory densities, high reliability, and low power consumption. Non-volatile memory may be used in, for example, personal computers, portable memory sticks, solid state drives (SSDs), personal digital assistants (PDAs), digital cameras, cellular telephones, portable music players, for example, MP3 players, and movie players, among other electronic devices. Data, such as program code, user data, and/or system data, such as a basic input/output system (BIOS), are typically stored in non-volatile memory devices.

Various memory devices employ power management schemes which may, for example, involve limiting a peak current draw of the system. For instance, some power management schemes may designate operations corresponding to current draw above a particular threshold as "high current events," and may prevent simultaneous performance of more than a particular of quantity of such operations. However, various power management schemes, such as those that limit the quantity of high current events capable of being simultaneously performed by a memory device, may adversely affect system performance.

BRIEF DESCRIPTION OF THE DRAWINGS

FIG. 4D is an example of configurations selected for a respective memory device in accordance with a number of embodiments of the present disclosure.

FIG. 4E is another example of configurations selected for a respective memory device in accordance with a number of embodiments of the present disclosure.

DETAILED DESCRIPTION

Figure 1:
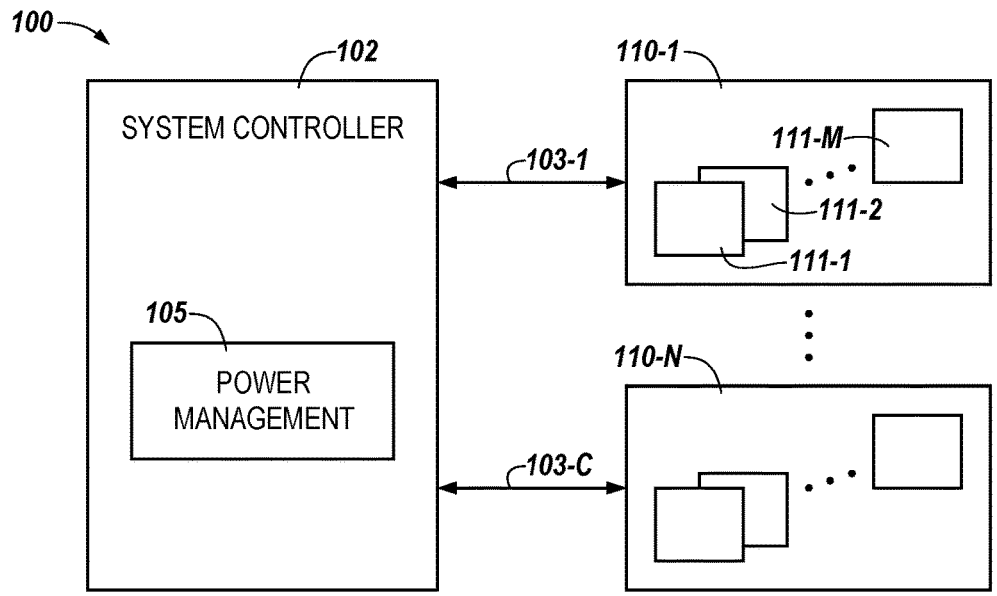
FIG. 1 is a block diagram of an apparatus in the form of a computing system including a system controller and a number of memory systems capable of providing indications associated with power management events in accordance with a number of embodiments of the present disclosure.

The present disclosure includes apparatuses and methods for providing indications associated with power management events. An example apparatus may include a plurality of memory units coupled to a shared power management signal. In this example apparatus, each of the plurality of memory units may be configured to provide to the other of the plurality of memory units, via the shared power management signal, an indication of whether the one of the plurality of memory units is entering a power management event. Further, each of the plurality of memory units may be configured to, if the one of the plurality of memory units is entering the power management event, an indication of a particular operation type associated with the power management event.

Embodiments of the present disclosure may provide benefits such as reducing underutilization of a memory system (e.g., an SSD including NAND dies). Accordingly, embodiments can improve performance rate of the memory system compared to previous approaches. For example, in some previous approaches, a memory system including several memory dies may perform operations without necessarily identifying currents that may be generated from different operation types. As such, the memory system would have to assume the same current for each of the operations, which usually would be a highest current, to avoid a worst case (e.g., current spikes), that one of the operations may generate.

In contrast, a number of embodiments of the present disclosure can include apparatuses and methods including memory units (e.g., memory dies) that are capable of communicating an operation type of an operation that each memory unit is entering. An operation whose operation type is communicated among the memory units may be a power management event.

As used herein, a power management event may refer to an operation whose performance is associated with generating a current above a threshold current level. As such, a memory device according to the present disclosure may provide benefits such as utilizing an idling capacity that would not have been utilized if the operations types were not communicated. The terms "operation" and "event" are used interchangeably herein and may have the same meaning, as appropriate to the context.

In the following detailed description of the present disclosure, reference is made to the accompanying drawings that form a part hereof, and in which is shown by way of illustration how one or more embodiments of the disclosure may be practiced. These embodiments are described in sufficient detail to enable those of ordinary skill in the art to practice the embodiments of this disclosure, and it is to be understood that other embodiments may be utilized and that process, electrical, and structural changes may be made without departing from the scope of the present disclosure.

As used herein, designators such as "N" and "M", particularly with respect to reference numerals in the drawings, indicate that a number of the particular feature so designated can be included. It is also to be understood that the terminology used herein is for the purpose of describing particular embodiments only, and is not intended to be limiting. As used herein, the singular forms "a", "an", and "the" can include both singular and plural referents, unless the context clearly dictates otherwise. In addition, "a number of" something (e.g., a number of memory cells) can refer to one or more of such things, whereas a "plurality of" is intended to refer to more than one of such things (e.g., more than one memory cell). Furthermore, the words "can" and "may" are used throughout this application in a permissive sense (e.g., having the potential to, being able to), not in a mandatory sense (e.g., required to).

The figures herein follow a numbering convention in which the first digit or digits correspond to the drawing figure number and the remaining digits identify an element or component in the drawing. Similar elements or components between different figures may be identified by the use of similar digits. For example, 110 may reference element "10" in FIG. 1, and a similar element may be referenced as 210 in FIG. 2.

FIG. 1 is a block diagram of an apparatus in the form of a computing system 100 including a system controller 102 and a number of memory devices 110-1, . . . , 110-N capable of providing indications associated with power management events in accordance with a number of embodiments of the present disclosure. As one example, the computing system 100 can be a solid state drive (SSD).

The computing system 100 may be a solid state drive (SSD) and may be coupled to a requesting device (not shown). The requesting device may be a host such as a personal laptop computer, a desktop computer, a digital camera, a mobile telephone, a memory card reader, a storage controller, and/or a storage system, among various other types of hosts that have access to and/or control over the computing system 100. The host may include a system motherboard and/or backplane and may include a number of memory access devices (e.g., a number of processors).

The system controller 102 may be coupled to a number of memory devices 110-1, . . . , 110-N (e.g., collectively referred to as memory devices 110) via a number of buses 103-1, . . . , 103-C (e.g., collectively referred to as buses 103), which may correspond to respective channels of the system. The buses 103 can send/receive various signals (e.g., data signals, control signals, and/or address signals) between the memory devices 110 and the system controller 102. Each of the buses 103 can include a separate data bus (DQ bus), control bus, and address bus. The buses 103 can have various types of bus structures including, but not limited to, bus structures related to Open NAND Flash Interface (ONFI), Compact Flash Interface, Multimedia Card (MMC), Secure Digital (SD), CE-ATA, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Card Bus, Universal Serial Bus (USB), Advanced Graphics Port (AGP), Personal Computer Memory Card International Association bus (PCMCIA), Firewire (IEEE 1394), and Small Computer Systems Interface (SCSI).

The system controller 102 may be utilized to communicate with the memory devices 110 to control access to the memory devices 110 and/or to facilitate data transfer associated with the memory devices 110. The system controller 102 can include, for example, a number of components in the form of hardware and/or firmware (e.g., one or more integrated circuits) and/or software for controlling access to the memory devices 110. As used herein, the system controller 102, or each of the memory devices 110 might also be separately considered an "apparatus."

The system controller 102 may include a power management unit 105. The power management unit 105 may include (e.g., store) a number of power management configurations associated with different power management settings of the system 100.

In a number of embodiments, a plurality of configurations may be selectable based on various criteria. For example, at least one of the plurality of configurations may be selected based on a current limit of a respective memory device (e.g., at least one of the memory devices 110) such that the respective memory devices, based on the selected configuration, may be capable of determining how many operations (e.g., power management events) may be simultaneously performed (e.g., without exceeding a current limit). Responsive to changes in the selected power management configuration (e.g., when a different configuration is selected, the system controller 102 may be configured to provide the changed configuration to a respective one of the memory devices 110 such that each of the memory units 111 may be configured to determine, based on the changed configuration, whether to perform a subsequent operation. As an example, the power management configurations can be provided via a command such as a SET FEATURES command as defined by the ONFi specification.

As illustrated in FIG. 1, the memory devices 110 can include a number of memory units 111-1, . . . , 111-M (e.g., collectively referred to as memory units 111) that provide a storage volume for the computing system 100. The memory units 111 can be dies or chips, which can be referred to as logical units (LUNs). As such, the memory devices 110 can be multi-chip packages (MCPs) that include a number of dies (e.g., memory units 111). The memory units 111 can include one or more arrays of memory cells. For example, the memory units 111 can include flash arrays having a NAND architecture.

As further described in connection with FIG. 2, each of the number of memory units 111 may include a control unit for controlling data read, write and erase operations and/or tracking operations (e.g., power management event) being performed within a respective one of the memory units 111. Each of the number of memory units 111 may also include a tracking unit to track a particular power management event being performed in one or more of the other memory units 111.

In a number of embodiments, each of the memory units 111 may be configured to determine whether to delay performing an operation based on the current power management configuration and on the operations already being performed by other memory units (e.g., other memory units 111 within the same memory device 110 or within a different memory device 110). For example, assuming a current power management configuration of the system allows for a particular number of operations (e.g., a particular quantity of high current events) to be performed concurrently within a memory device 110 without exceeding a current limit, a particular one of the memory units 111, prior to performing a requested operation, may be configured to determine operation types and/or sub-operation types and associated current values of other operations being performed by other memory units 111. Therefore, the particular memory unit 111 can determine whether or not to perform the requested operation based on whether doing so would exceed the system current threshold limit. If it is determined that performing the operation would exceed the current limit, then the particular one of the memory units 111 may be configured to delay performing the operation, for example, until at least some of the number of operations being performed by the other memory units are finished. If it is determined that performing the operation would not exceed the current limit, then the particular one of the memory units 111 may be configured to perform the requested operation simultaneously with the number of other operations.

Figure 2:
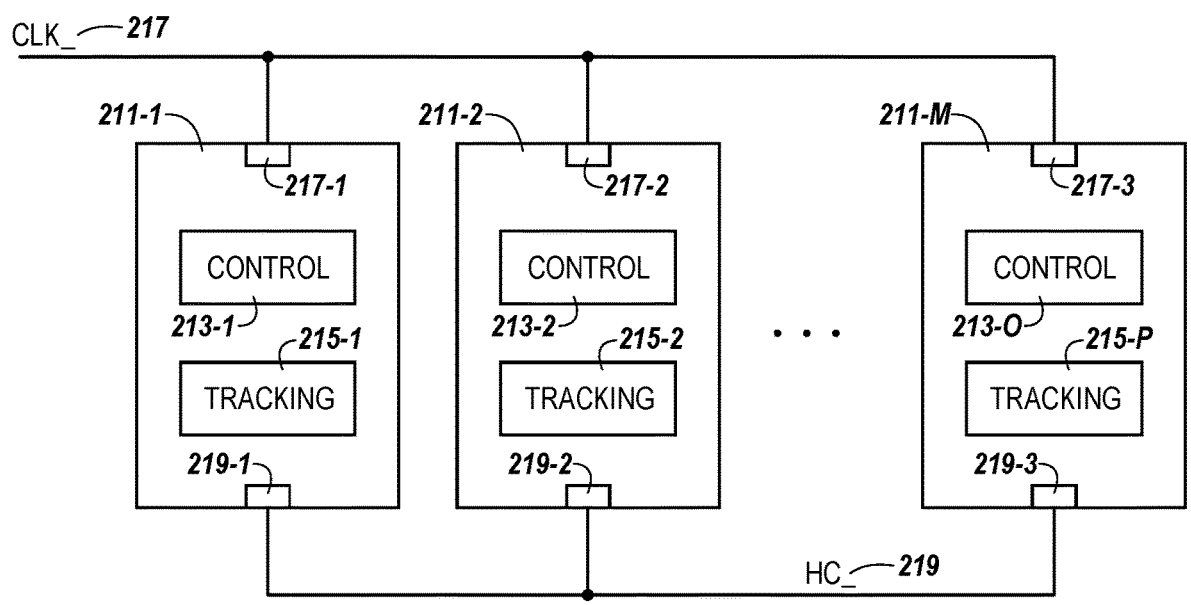
FIG. 2 is a block diagram of a number of memory units capable of providing indications associated with power management events in accordance with a number of embodiments of the present disclosure.

FIG. 2 is a block diagram of a number of memory units 211-1, . . . , 211-M capable of providing indications associated with power management events in accordance with a number of embodiments of the present disclosure. The memory units 211-1, . . . , 211-M (e.g., collectively referred to as memory units 211) are analogous to the memory units 111 described in connection with FIG. 1.

As shown in FIG. 2, the memory units 211 can be configured to receive a shared clock signal 217 ("CLK_") via respective pads 217-1, 217-2, . . . , 217-M. The shared (e.g., common) clock signal 217 can be used, for example, to synchronize communication among the memory units 211. For instance, the memory units 211 can monitor CLK_ (e.g., by counting clock cycles) to determine when it is a respective one of the memory units' turn to output its state (e.g., whether or not it is about to enter a high current event).

The shared clock signal 217 may be used, by each of the memory units 211, to determine when a particular one of the memory units 211 is entering a particular power management event. For example, the memory units 211, via the shared clock signal 217, may know when a power management event is started and finished by the particular one of the memory units 211. As such, another of the memory units 211 may perform a subsequent operation that was delayed due to the indications provided by the particular one of the memory units 211, for example, immediately subsequent to the power management event.

The memory units 211 may include respective control units 213-1, . . . , 213-M (e.g., collectively referred to as control units 213) and respective tracking units 215-1, . . . , 215-M (e.g., collectively referred to as tracking units 215). As one example, the control units 213 may be on the same die or a different die than a die or dice corresponding to the respective memory units 211. In a number of embodiments, the control units 213 can comprise control circuitry for performing operations received from a system controller such as controller 102 shown in FIG. 1. The control units 213 may be referred to as memory controllers.

In a number of embodiments, and as shown in FIG. 2, each of the memory units 211 includes a respective pad 219-1, 219-2, . . . , 219-M to receive a power management signal 219 ("HC_"). The memory units 211 can take turns controlling the signal 219 in association with performing power management functions. For example, the signal 219 may be driven low (e.g., by a particular memory unit 211) to indicate that the particular memory unit 211 is entering a power management event (e.g., about to perform an operation designated as a "high current" event). The memory units 211 can provide other indications associated with the power management events (e.g., via signal 219). The indications that may be provided by the memory units 211 may include, for example, a particular operation and/or sub-operation type associated with a power management event the respective memory unit 211 is entering. For example, one of the memory units 211 may toggle the power management signal 219 (e.g., drive it low during a particular clock cycle) to indicate the particular memory unit 211 is entering a power management event, and may then toggle the signal 219 an additional number of times to provide an operation code to the other memory units 211 which can indicate to the other memory units 211 the particular operation or sub-operation the particular memory unit 211 is about to enter. Providing the indications regarding power management events to the memory units 211 in this manner (e.g., via signal 219) can reduce the amount of and/or complexity of circuitry required to perform power management functions, while also improving system performance while complying with power specifications such as system current threshold limits.

Each of the control units 213 may be configured to control executing operations (e.g., data read, write, and/or erase operations, among other operations) on the respective memory units 211, for example, based on the indications provided by memory units 211. For example, each of the memory units, via a respective one of the control units 213, may be configured to determine whether to delay performance of a subsequent operation based, at least partially, on the indications provided by the other of the memory units 211.

Each of the memory units 211 may utilize a respective one of the tracking units 215 to track states of the other of the memory units 211. For example, each of the memory units 211, via a respective one of the tracking units 215, may determine whether other of the memory units 211 are entering a power management event. For example, each of the memory units 211, via a respective one of the tracking units 215, may determine whether the other of the memory units 211 are still performing the power management event or the power management event has completed.

Figure 3:
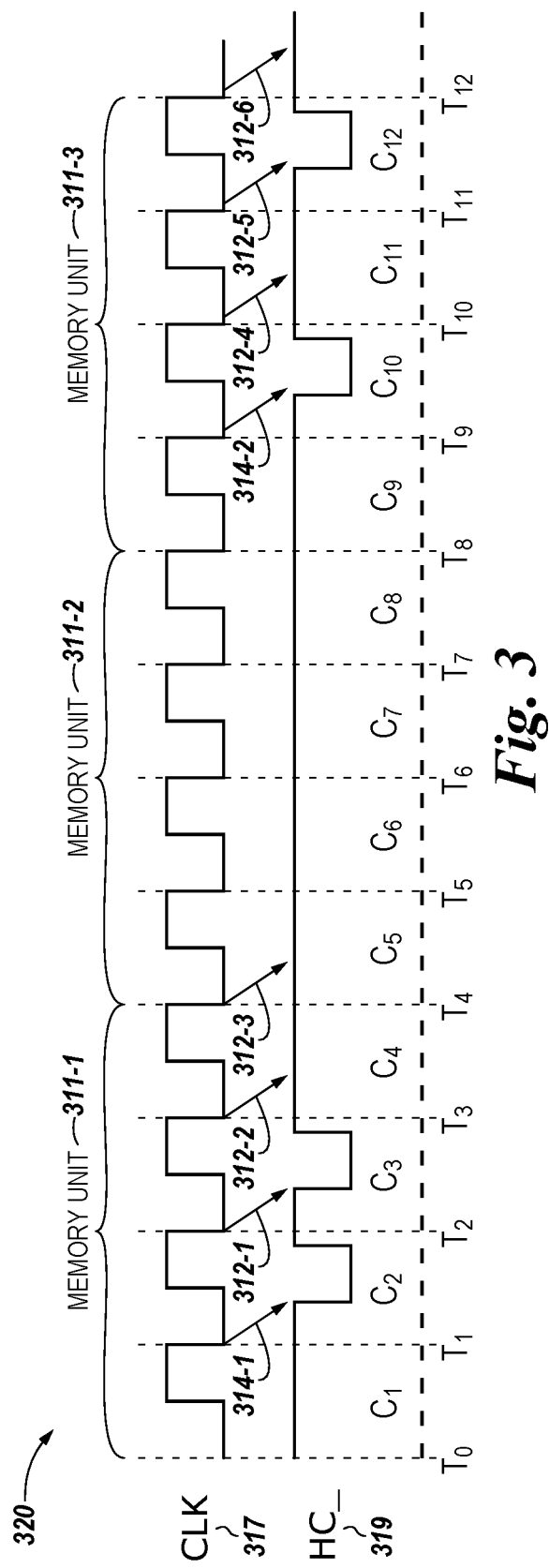
FIG. 3 illustrates a diagram for providing indications associated with power management events in accordance with a number of embodiments of the present disclosure.

FIG. 3 illustrates a diagram 320 for providing indications associated with power management events in accordance with a number of embodiments of the present disclosure. FIG. 3 illustrates three time sequential time periods in which respective memory units 311-1, 311-2, and 311-3 take turns driving a power management signal 319 (HC_). The memory units may be analogous to the memory units 111 and 211 illustrated in connection with FIG. 1 and FIG. 2. The clock signal 317 (CLK_) and the power management signal 319 (HC_) may be analogous to the respective signals 217 and 219 described in association with FIG. 2.

FIG. 3 illustrates a plurality of cycles of the clock signal 317. A clock cycle can refer to a time between two consecutive falling edges of the clock signal 317. For example, a first clock cycle (e.g., C1) refers to a time between a first falling edge (e.g., at time T0) and a second falling edge (e.g., at time T1), as illustrated in FIG. 3. Similarly, a second clock cycle (e.g., C2) refers to a time between a second falling edge (e.g., at time T1) and a third falling edge (e.g., at time T2). A number of additional clock cycles (e.g., C3-C12) are also illustrated in FIG. 3.

Each of the memory units 311 may be (e.g., sequentially) assigned a number of clock cycles during which each of the memory units 311 may be given an opportunity to provide indications associated with power management events. For example, as illustrated in FIG. 3, each of the memory units 311 may be assigned 4 clock cycles. The memory unit 311-1 may be assigned first 4 clock cycles (e.g., C1-C4); the memory unit 311-2 may be assigned next 4 clock cycles (e.g., C5-C8); and the memory unit 311-3 may be assigned next 4 clock cycles (e.g., C9-C12). However, embodiments are not so limited. For example, each of the memory units 311 may be assigned fewer or more clock cycles for providing indications associated with the power management events. A number of clock cycles that may be assigned to each of the memory units 311 may be based on a number of bits of an operation code, as will be further described herein.

Each of the memory units 311 may be configured to provide to the other of the plurality of memory units 311 (e.g., from the memory unit 311-1 to memory units 311-2 and 311-3), via the shared power management signal 319, an indication of whether the one of the memory units 311 is entering the power management event. The indication may be provided during a first cycle of each of the plurality of assigned clock cycles. For example, each of the memory units 311, if entering the power management event, may toggle the power management signal 319 during its first cycle (e.g., C1, C5, and C9) of clock cycles assigned to each of the memory units 311.

In the example shown in FIG. 3, the memory unit 311-1 toggles the power management signal 319 during its first cycle C1 (e.g., indicated by an arrow 314-1), and may enter the power management event (e.g., either immediately or at some later point). Subsequent to C1-C4, the memory unit 311-2, when it becomes its turn to provide the indications associated with the power management events, does not toggle the power management signal 319 during its first cycle C5, and does not enter the power management event. Subsequent to C5-C8, the memory unit 311-3, when it becomes its turn to provide the indications associated with the power management events, toggles the power management signal 319 during its first cycle C9 (e.g., indicated by an arrow 314-2), and may enter the power management event (e.g., either immediately or at some later point). As a result, the power management signal 319 toggled during the clock cycles C1-C12 may indicate that the memory unit 311-1 and 311-3 are entering the power management events, and the memory unit 311-2 is not entering the power management event.

If one of the memory units 311 is entering a power management event, the one of the memory units 311 may be configured to provide another indication of a particular operation associated with the power management event. The indication of the particular operation associated with the power management event may be provided as an operation code on the power management signal 319. As illustrated in FIG. 3, clock cycles (e.g., C2-C4, C6-C8, and C10-C12) subsequent to each first (e.g., C1, C5, and C9) of the assigned clock cycles may be utilized for providing the respective operation codes.

Each of the clock cycles assigned for providing an operation code may sequentially correspond to a respective bit of the operation code. For example, a value (e.g., logic "1" or logic "0") of each bit of the operation code may be determined based on whether the power management signal is toggled or not during a corresponding clock cycle. As an example, assuming that an operation code comprises three bits (e.g., "110"), a first clock cycle (e.g., among those clock cycles assigned for providing operation codes) may correspond to a first bit; a second clock cycle may correspond to a second bit; and a third clock cycle may correspond to a third bit of the operation code.

As an example, the memory unit 311-1 toggles the power management signal 319 during a cycle C2 (e.g., as indicated by an arrow 312-1) while not toggling the power management signal 319 during cycles C3 (e.g., as indicated by an arrow 312-2) and C4 (e.g., as indicated by an arrow 312-3). Since C2 is a first clock cycle among the clock cycles assigned to the memory unit 311-1 for providing an operation code, the operation code output by the memory unit 311-1 has a value of "011." In this example, no operation code is provided by the memory unit 311-2 since the memory unit 311-2 communicated to other memory units (e.g., 311-1 and 311-3) that the memory unit 311-2 is not entering a power management event. In this example, the memory unit 311-3 toggles the power management signal 319 during a cycle C11 (e.g., as indicated by an arrow 312-5) while not toggling the power management signal 319 during cycle C10 (e.g., as indicated by an arrow 312-4) and C12 (e.g., as indicated by an arrow 321-6). Since C11 is a second clock cycle among the clock cycle assigned to the memory unit 311-3 for providing an operation code, the operation code provided by the memory unit 311-3 has a value of "101."

The memory units 311 may be configured to identify an operation type for a power management event based on the operation code that is generated at, and provided from, a particular one of the memory units 311. For example, the memory unit 311-1 provides an operation code having a value of "011," which may indicate that the memory unit 311-1 is entering a bit-line precharge operation. For example, the memory unit 311-3 provides an operation code having a value of "101," which may indicate that the memory unit 311-3 is entering a pump turn operation. As such, the memory units 311 may be configured to determine whether to perform a subsequent operation responsive to the identified operation type being performed by the other memory units 311.

As noted previously, a number of clock cycles that may be assigned to each of the memory units 311 may be based on a number of bits of an operation code that may be provided by the memory units 311. In this example, the operation code is assumed to have three bits; therefore, four clock cycles (e.g., including one clock cycle for providing indication of whether to enter a power management event) are assigned to each of the memory units 311. In another example, only three clock cycles may be assigned to each of the memory units 311 (e.g., for a two-bit operation code).

Operation types that may be indicated (e.g., identifiable) by operation codes may include a read operation, a program operation, and an erase operation. The operation codes may further indicate (e.g., identify) sub-operation types for a respective one of the operation types. For example, the sub-operations identifiable by the operation codes may include a bit-line precharge operation (e.g., for a read operation) and a pump turn operation (e.g., for a program operation), among various sub-operations each of which may include a different associated current profile.

Figure 4A:
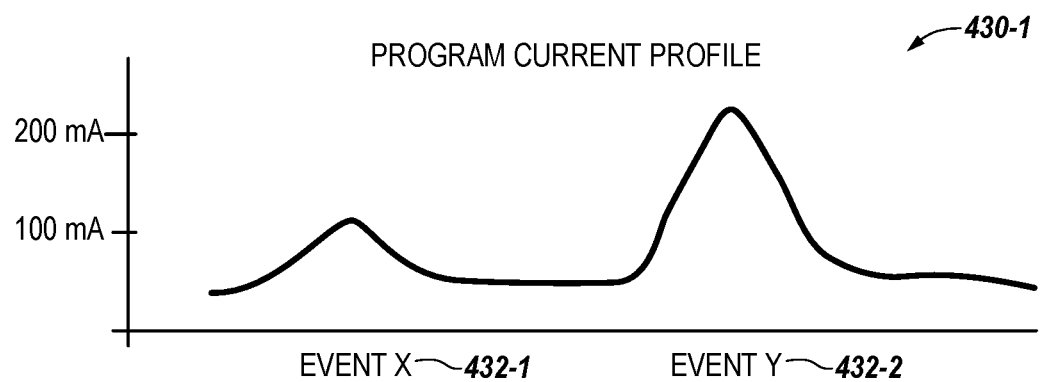
FIG. 4A is a graph illustrating currents associated with respective operation types of power management events in accordance with a number of embodiments of the present disclosure.
Figure 4B:
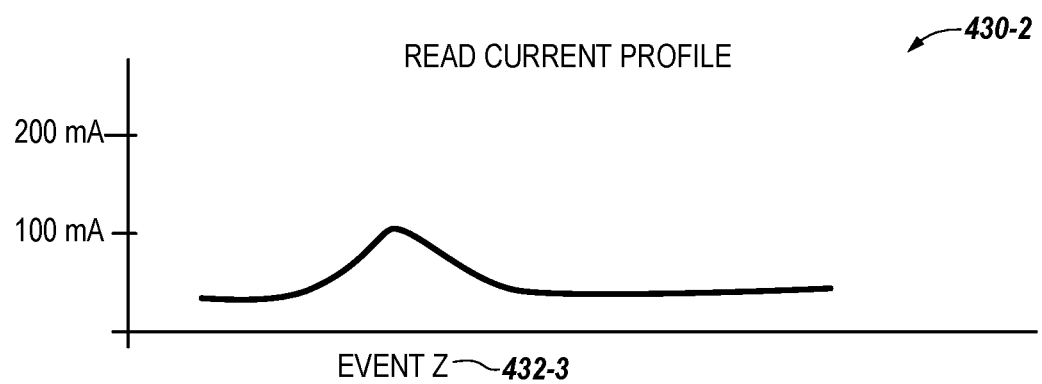
FIG. 4B is another graph illustrating currents associated with respective operation types of power management events in accordance with a number of embodiments of the present disclosure.

FIGS. 4A-4B are graphs 430-1/430-2 illustrating current profiles associated with respective operations corresponding to power management events in accordance with a number of embodiments of the present disclosure. Graph 430-1 illustrates current profiles of two different program operations 432-1 and 432-2 (e.g., Event X and Event Y, respectively), and graph 430-2 illustrate a current profile of a read operation 432-3 (e.g., Event Z). In this example, each of the three operations 432-1, 432-2, and 432-3 are assumed to be power management events. That is, all events 432-1, 432-2, and 432-3 are associated with operations whose performances are associated with generating a current at or above a threshold current level (e.g., 100 mA in this example).

The current profiles associated with various operations may be known by a system. For instance, in this example, it is known (or assumed) that performing operation 432-1 involves generating a current of 100 mA, performing operation 432-2 involves generating) a current of 200 mA, and performing operation 432-3 involves generating a current of 100 mA. As an example, a memory device (e.g., memory devices 110) that performs events X and Z simultaneously may generate 200 mA. As another example, a memory device (e.g., memory devices 110) that performs events X, Y, and Z simultaneously may generate 400 mA. As such, the known current associated with each of the operations may be utilized, for example, in determining whether to perform a plurality of operations simultaneously or not (e.g., whether performing the operations together will exceed a current threshold limit of the device and/or system).

Embodiments of the present disclosure provide benefits such as reducing underutilization of a memory device in association with a particular power management scheme. For example, consider a memory device operating under a power management configuration setting that only allows for performance of one power management event (e.g., operation designated as a high current event) at a time. If we assume that the device has a current threshold limit of 200 mA, the power management setting would only allow the device to perform one of events X, Y, and Z at a time. However, since events X and Z generate 100 mA each, the device could perform both event X and event Z simultaneously without violating the current threshold limit of the device. Accordingly, without knowing which particular power management event is being entered by a particular memory unit within a memory device, the other memory units within the device may have to wait unnecessarily for the completion of the event before performing an operation (e.g., since it must be assumed that the power management event is a 200 mA event). Accordingly, it can be useful for a memory unit within a device to be able to determine not only whether other memory units within the device are performing a power management event, but which particular event among the various power management events is being performed.

Figure 4C:
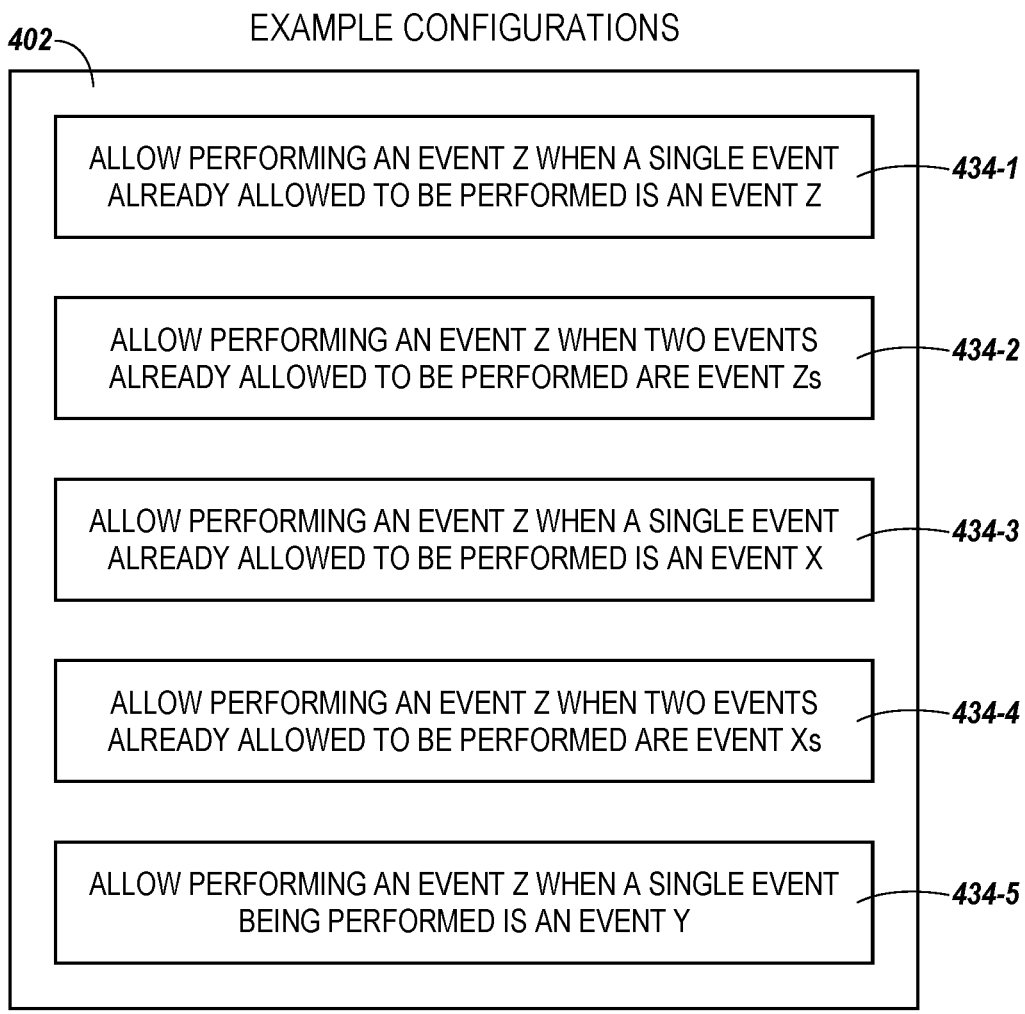
FIG. 4C is an example of configurations for determining whether to perform power management events in accordance with a number of embodiments of the present disclosure.

FIG. 4C is an example of configurations 434 for determining whether to perform power management events in accordance with a number of embodiments of the present disclosure. The power management events X, Y, and Z described in the example configurations 434 may be analogous to those described in connection with FIG. 4B. For example, the events X, Y, and Z may, when performed, generate a current of 100 mA, 200 mA, and 100 mA, respectively. Configurations 434-1, 434-2, 434-3, 434-4, and 434-5 may be collectively referred to as configurations 434.

In a number of embodiments, the configurations 434 may be stored in a system controller 402. For example, the configurations 434 may be stored in a power management unit (e.g., power management unit 105) of the system controller 402.

A memory unit, according to the configuration 434-1, may perform an event Z when a single event already allowed to be performed (e.g., and being performed) is an event Z. For example, one of memory units (e.g. memory units 111) may be requested (e.g., by a system controller 102) to perform an event Z. In this example, prior to performing the event Z, the memory unit may check the configuration 434-1 the memory unit stores, and determine that the configuration 434-1 would not allow the memory unit to perform the requested event (e.g., event Z) unless a single event (e.g., only event being performed within the memory device 110) is also event Z.

A memory unit, according to the configuration 434-2, may perform an event Z when two events already allowed to be performed (e.g., and being performed) are event Zs. For example, one of memory units (e.g., memory units 111) may be requested (e.g., by a system controller 102) to perform an event Z. In this example, prior to performing the event Z, the memory unit may check the configuration 434-2 the memory unit stores, and determine that the configuration 434-2 would not allow the memory unit to perform the requested event (e.g., event Z) unless two events (e.g., only events being performed within the memory device) are both event Zs.

A memory unit, according to the configuration 434-3, may perform an event Z when a single event already allowed to be performed (e.g., and being performed) is an event X. For example, one of memory units (e.g. memory units 111) may be requested (e.g., by a system controller 102) to perform an event Z. In this example, prior to performing the event Z, the memory unit may check the configuration 434-3 the memory unit stores, and determine that the configuration 434-3 would not allow the memory unit to perform the requested event (e.g., event Z) unless a single event (e.g., only event being performed within the memory device 110) is also event X.

A memory unit, according to the configuration 434-4, may perform an event Z when two events already allowed to be performed (e.g., and being performed) are event Xs. For example, one of memory units (e.g., memory units 111) may be requested (e.g., by a system controller 102) to perform an event Z. In this example, prior to performing the event Z, the memory unit may check the configuration 434-4 the memory unit stores, and determine that the configuration 434-4 would not allow the memory unit to perform the requested event (e.g., event Z) unless two events (e.g., only events being performed within the memory device) are both event Xs.

At least one of the example configurations 434 may be selectable based on a current limit of respective memory devices 410-1 and 410-2. For example, according to the configuration 434-1, an event Z (e.g., 100 mA) may be performed simultaneously with another event Z (e.g., 100 mA). As such, a current associated with the events allowed to be simultaneously performed according to configurations 434-1 is 200 mA. Similarly, and a current associated with the events allowed to be simultaneously performed according to configurations 434-2, 434-3, 434-4, 434-5 are 300 mA, 200 mA, 300 mA, 300 mA, respectively. As such, configurations 434-1 and 434-3 may be configurations selectable for a memory device having a current limit of 200 mA, and configurations 434-1, 434-2, 434-3, 434-4, and 434-5 may be configurations selectable for a memory device having a current limit of 300 mA. Stated differently, configurations 434 selected for a respective memory device may indicate whether performing a subsequent operation (e.g., in addition to those power management events being performed) would exceed a current limit (e.g., predetermined current limit) of the respective memory device. Therefore, the respective memory device, according to the configurations, may be configured to delay performing the subsequent operation responsive determining that performing the subsequent operation would exceed the current limit.

A memory unit, according to the configuration 434-5, may perform an event Z when a single event already allowed to be performed (e.g., and being performed) is an event Y. For example, one of memory units (e.g. memory units 111) may be requested (e.g., by a system controller 102) to perform an event Z. In this example, prior to performing the event Z, the memory unit may check the configuration 434-5 the memory unit stores, and determine that the configuration 434-5 would not allow the memory unit to perform the requested event (e.g., event Z) unless a single event (e.g., only event being performed within the memory device 110) is also event Y.

The memory units (e.g., memory units 111) may entirely depend on the configuration 434 in determining whether to perform a power management event. For example, the memory unit that selected the configuration 434-1 only may not perform the event Z unless a single event (e.g., only event being performed within the memory device 110) is an event Z. In another example, the memory unit that selected the configuration 434-3 only may not perform the event Z unless a single event (e.g., only event being performed within the memory device 110) is an event X. As such, another configuration (e.g., configurations that are not listed in the configurations 434) may be addable to the configurations 434 (e.g., to provide additional selectable configurations) to cover a variety of different scenarios.

In a number of embodiments, more than one of the configurations 434 may be simultaneously selectable such that the respective memory units (e.g., memory units 111) may be configured to determine, based on the more than one of the configurations 434, whether to perform the subsequent operation. As an example, configurations 434-1 and 434-3 may be simultaneously selected for a memory device having a current limit of 200 mA.

FIG. 4D is an example 440 of configurations selected for a respective memory device in accordance with a number of embodiments of the present disclosure. Each row 442 and 444 includes a current limit and configurations selected for respective memory devices 410-1 and 410-2. For example, a row 442 includes information of a current limit and configurations selected for a memory device 410-1. For example, a row 444 includes information of a current limit and configurations selected for a memory device 410-2. The memory devices 410-1 and 410-2 may be analogous to those memory devices described in connection with FIG. 1 (e.g., memory devices 110) and FIG. 2 (e.g., memory device 210).

The configurations selected for the respective memory device 410-1 and 410-2 may be one or more of the configurations described in connection with FIG. 4C. For example, a configuration 434-1 described in connection with FIG. 4D may be analogous to the configuration 434-1 described in connection with FIG. 4C, which allows performing an event Z when a single event already allowed to be performed is an event Z.

In this example, the memory device 410-1 and 410-2 may have a current limit of 200 mA and 300 mA, respectively. That is, the memory device 410-1 and 410-2 can simultaneously perform a quantity of events whose associated currents may amount to no more than 200 mA and 300 mA, respectively.

In the example shown in FIG. 4D, configurations 434-1 and 434-3 are selected for the memory device 410-1 having a current limit of 200 mA. As such, the memory device 410-1 may perform an event Z when a single event already allowed to be performed is either event Z or event X. As an example, when a single operation (e.g., only operation already allowed to be performed and still being performed) within the memory device 410-1 is an event Z or event X, the memory device 410-1 needs not delay a performance of the another event Z until the single operation is finished.

In the example shown in FIG. 4D, configurations 434-1, 434-2, and 434-5 are selected for the memory device 410-2 having a current limit of 300 mA. As such, the memory device 410-2 may perform an event Z when a single event already allowed to be performed is either event Z or event Y or when two events already allowed to be performed are event Zs. As an example, when a single event (e.g., only operation already allowed to be performed and still being performed) is either event Z or event Y, the memory device 410-2 may perform another event Z. As an example, when two operations (e.g., only operations already allowed to be performed and still being performed) within the memory device 410-2 are both event Zs, the memory device 410-2 needs not delay performance of the another event Z until the single operation (e.g., event Z or event Y) or two operations (e.g., event Zs) are finished.

FIG. 4E is another example 450 of configurations selected for a respective memory device in accordance with a number of embodiments of the present disclosure. Each row 452 and 454 includes a current limit and configurations selected for respective memory devices 410-1 and 410-2. For example, a row 452 includes information of a current limit and configurations selected for a memory device 410-1. For example, a row 454 includes information of a current limit and configurations selected for a memory device 410-2. The memory devices 410-1 and 410-2 may be analogous to those memory devices described in connection with FIG. 4. For example, the memory device 410-1 and 410-2 may have a current limit of 200 mA and 300 mA, respectively.

In the example shown in FIG. 4E, a configuration 434-3 is selected for the memory device 410-1 having a current limit of 200 mA. As such, the memory device 410-1 may perform an event Z when a single event already allowed to be performed is an event X. As an example, when a single operation (e.g., only operation already allowed to be performed and still being performed) within the memory device 410-1 is an event X, the memory device 410-1 needs not delay a performance of the another event Z until the single operation (e.g., event X) is finished.

In the example shown in FIG. 4E, configurations 434-3 and 434-4 are selected for the memory device 410-2 having a current limit of 300 mA. As such, the memory device 410-2 may perform an event Z when there is either a single event X or two event Xs already allowed to be performed. As an example, when events (e.g., a single or two events) already allowed to be performed and being performed within the memory device 410-2 are all event X, the memory device 410-2 does not need to delay a performance of the another event Z until the operations (e.g., one or two event Xs) are finished.

Although specific embodiments have been illustrated and described herein, those of ordinary skill in the art will appreciate that an arrangement calculated to achieve the same results can be substituted for the specific embodiments shown. This disclosure is intended to cover adaptations or variations of a number of embodiments of the present disclosure. It is to be understood that the above description has been made in an illustrative fashion, and not a restrictive one. Combination of the above embodiments and other embodiments not specifically described herein will be apparent to those of ordinary skill in the art upon reviewing the above description. The scope of a number of embodiments of the present disclosure includes other applications in which the above structures and methods are used. Therefore, the scope of a number of embodiments of the present disclosure should be determined with reference to the appended claims, along with the full range of equivalents to which such claims are entitled.

In the foregoing Detailed Description, some features are grouped together in a single embodiment for the purpose of streamlining the disclosure. This method of disclosure is not to be interpreted as reflecting an intention that the disclosed embodiments of the present disclosure have to use more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separate embodiment.

What is claimed is:

1. An apparatus, comprising:
   a plurality of memory units coupled to a shared power management signal, wherein each one of the plurality of memory units is configured to:
   provide to the other of the plurality of memory units, via the shared power management signal:
   an indication of whether the one of the plurality of memory units is entering a power management event, wherein the power management event corresponds to a respective one of a plurality of operations whose performance is associated with generating a current above a threshold current level; and
   if the one of the plurality of memory units determines to perform an operation corresponding to the power management event, an indication of a particular operation type associated with the operation
   wherein the plurality of memory units are configured to receive a shared clock signal, and wherein the shared clock signal is used, by each respective one of the plurality of memory units, to determine when a particular one of the plurality of memory units is entering a particular power management event.

2. The apparatus of claim 1, wherein each one of the plurality of memory units is further configured to determine whether to delay performance of a subsequent operation based, at least partially, on the indications provided by the other of the plurality of memory units.

3. The apparatus of claim 1, wherein the power management event is one of a plurality of power management events each associated with an operation whose performance is associated with generating a current above a threshold current level.

4. The apparatus of claim 1, wherein the indication of the particular operation type includes:
   an indication of whether the power management event is a read operation, a program operation, or an erase operation; and
   an indication of a sub-operation type associated with the read operation, the program operation, or the erase operation.

5. The apparatus of claim 1, wherein each one of the plurality of memory units is further configured to:
   provide the indication of whether the one of the plurality of memory units is entering a power management event by toggling the shared power management signal; and
   if the one of the plurality of memory units is entering the power management event, provide the another indication of the particular operation type associated with the power management event by providing an operation code on the shared power management signal subsequent to toggling the shared power management signal.

6. A method comprising:
   providing, via a power management signal shared by a plurality of memory units, a first indication whether one of the plurality of memory units is entering a power management event; and
   providing, via the power management signal, a second indication of a particular operation type associated with the power management event to be performed when the one of the plurality of memory units is entering the power management event, wherein the power management signal is a shared clock signal that is used, by each respective one of the plurality of memory units, to determine when a particular one of the plurality of memory units is entering a particular power management event;
   wherein the first indication and the second indication are provided from the one of the plurality of memory units to the other of the plurality of memory units.

7. The method of claim 6, wherein the method includes receiving, at the plurality of memory units, a shared clock signal simultaneously, and each of the plurality of memory units provides the first indication and the second indication during an assigned plurality of clock cycles that are counted based on the clock signal.

8. The method of claim 7, wherein providing to other of the plurality of memory units, via the shared power management signal, the first indication comprises toggling, during a particular clock cycle, the shared power management signal when the one of the plurality of memory units is entering the power management event.

9. The method of claim 8, wherein providing to other of the plurality of memory units, via the shared power management signal, the second comprises toggling, during a plurality of clock cycles subsequent to the particular clock cycle, the shared power management signal.

10. The method of claim 9, wherein each of the plurality of clock cycles corresponds to a respective bit of an operation code corresponding to the second indication, and wherein the method includes:
    toggling the shared power management signal to indicate a set value for the respective bit of the operation code; and
    not toggling the shared power management signal to indicate a reset value for the respective bit of the operation code.

11. An apparatus, comprising:
    a plurality of memory units coupled to a shared power management signal, each one of the plurality of memory units including a control component, wherein the shared power management signal is a shared clock signal and each one of the plurality of memory units is, via a respective control component, configured to:
    determine, using the shared power management signal corresponding to a shared clock signal, when a particular one of the plurality of memory units is entering a particular power management event;
    identify one of a plurality of operation types for an operation corresponding to the particular power management event based on a received operation code associated with the particular power management event, wherein the operation code is generated at, and provided from, another of the plurality of memory units when the another of the plurality of memory units is about to enter the particular power management event; and determine whether a configuration would allow, responsive to the identified operation type, a subsequent operation to be performed.

12. The apparatus of claim 11, wherein the configuration is one of a plurality of configurations, and wherein another configuration is addable to the plurality of configurations such that more configurations are selectable from the plurality of configurations with the another configuration added.

13. The apparatus of claim 11, wherein the configuration is one of a plurality of configurations, and at least one of the plurality of configurations is selectable based on a current limit of the apparatus.

14. The apparatus of claim 13, wherein multiple of the plurality of configurations are simultaneously selectable such that each one of the plurality of memory units is configured to determine, based on the multiple of the plurality of configurations, whether to perform the subsequent operation.

15. The apparatus of claim 13, wherein the apparatus includes a system controller coupled to the plurality of memory units, and wherein the plurality of configurations are stored in the system controller that includes the power management signal.

16. The apparatus of claim 15, wherein the system controller is configured to provide, responsive to changes in the selected configurations, the changed configurations to the plurality of memory units such that each one of the plurality of memory units is configured to determine, based on the changed configurations, whether to perform the subsequent operation.

17. The apparatus of claim 13, wherein each one of the plurality of memory units is configured to compare, based on the configuration, a sum of currents associated with respective power management events being performed among the plurality of memory units to the current limit of apparatus.

18. The apparatus of claim 11, wherein the identified operation type is one of a plurality of identifiable operation types each including a plurality of respective identifiable sub-operations, and wherein a current associated with each of the plurality of respective identifiable sub-operations is known.

19. The apparatus of claim 11, wherein at least one of the plurality of memory units is a NAND flash memory die.

* * * * *